F. BÖMINGHAUS.
GUN ELEVATING MECHANISM.
APPLICATION FILED JAN. 14, 1910.

1,079,831.

Patented Nov. 25, 1913.

Witnesses
J. M. Stynkrop
Ida T. Stanley

Inventor,
Franz Böminghaus,
By Knight Bros
attorneys

UNITED STATES PATENT OFFICE.

FRANZ BÖMINGHAUS, OF ESSEN-ON-THE-RUHR, GERMANY, ASSIGNOR TO FRIED. KRUPP AKTIENGESELLSCHAFT, OF ESSEN-ON-THE-RUHR, GERMANY.

GUN-ELEVATING MECHANISM.

1,079,831.     Specification of Letters Patent.     Patented Nov. 25, 1913.

Application filed January 14, 1910. Serial No. 538,045.

*To all whom it may concern:*

Be it known that I, FRANZ BÖMINGHAUS, a subject of the Emperor of Germany, and a resident of Essen-on-the-Ruhr, Germany, have invented certain new and useful Improvements in Gun-Elevating Mechanisms, of which the following is a specification.

This invention relates to those gun elevating mechanisms in which two driving mechanisms independent of each other, are provided for the movement of the gun barrel, both of which driving mechanisms are arranged upon a portion of the mount which does not partake of the elevating movement of the gun barrel, and one of which is adapted to impart a quicker movement than the other in transferring from the firing position to the loading position and vice versa. In the known elevating mechanisms of this kind, a coupling is introduced in the drive gear which, in the use of one driving mechanism, is thrown in and after completion of the adjustment is again thrown out. The use of clutches adapted to be thus thrown in and out, is for various reasons, not very desirable in elevating mechanism for guns.

The present invention has for its purpose to provide an elevating mechanism of the premised kind, in which the use of engaging and disengaging couplings is dispensed with in the simplest possible manner. This purpose is attained according to this invention by a construction of the elevating mechanism in which a member standing in positive connection with one of the driving members, together with one in connection with another driving member and one connected with the gun barrel constitute a closed kinematic train in which, when the member standing in positive connection with one of the driving members is fixed relatively to the mount, positive connection exists between that connected with the other driving member and that connected with the gun barrel and the ratio of transmission of the enforced connection produced by the arrest of the one member is different from the ratio of transmission of the connection enforced by the arrest of the other member.

Figure 1:
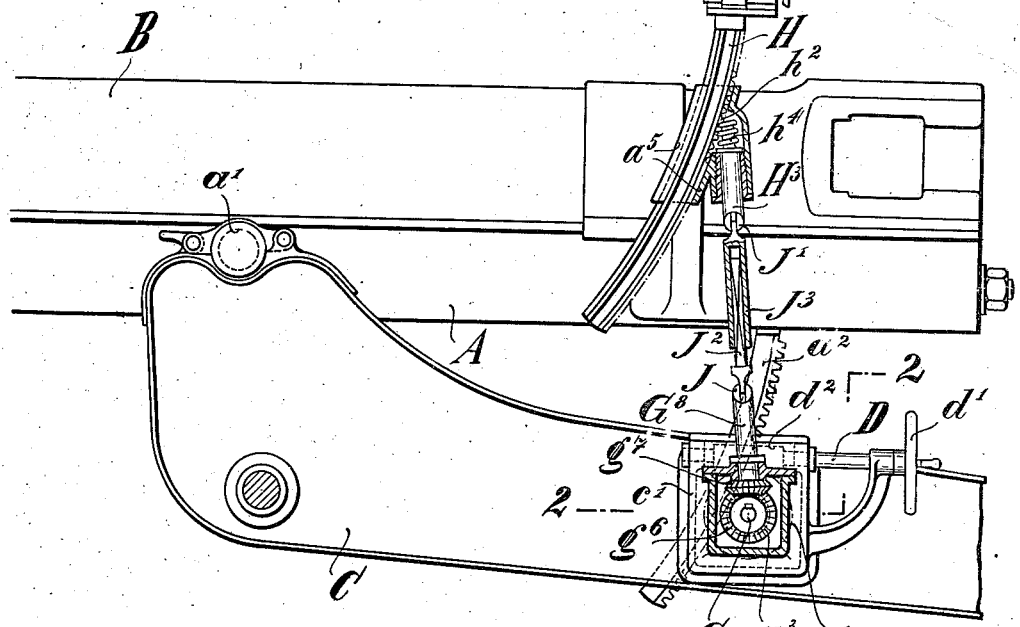
Figure 2:
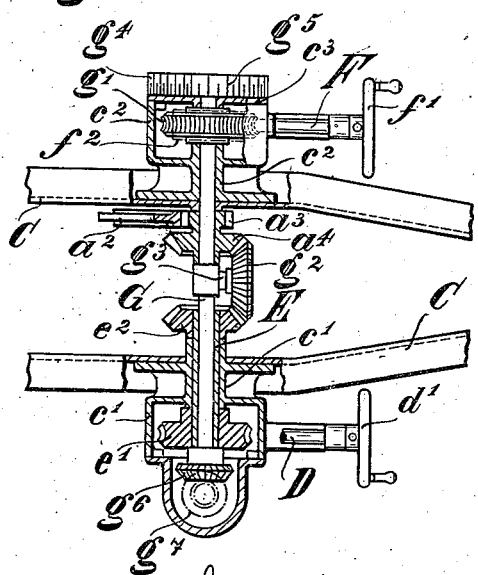

In the accompanying drawings:—Figure 1 is a side elevation, partly in section, of the parts of the gun which are concerned with one embodiment of the elevating mechanism constituting the subject matter of this invention and provided with a sighting arrangement having an independent sighting line and Fig. 2 is a top view of the embodiment shown in Fig. 1, partly in section on the line 2—2, Fig. 1 (individual parts being omitted).

The slide-track carrier A, which carries the gun barrel B, is swingingly mounted in the mount C through the medium of the horizontal trunnions $a^1$ (Fig. 1).

The elevating mechanism consists of a toothed arc $a^2$ rigidly connected with the slide-track carrier A, a gear wheel $a^3$ standing in engagement with said toothed arc, and two drives for the gear wheel $a^3$. The first drive consists, essentially, of a shaft D carrying a hand wheel $d^1$ and a worm $d^2$ (Fig. 1), a worm wheel $e^1$ standing in engagement with the worm $d^2$, and rigidly connected with a hollow shaft E, a cone wheel $e^2$, which is rigidly mounted upon the inner end of the hollow shaft E, the cone wheel $g^2$, loosely mounted upon the arm $g^3$ of the shaft G which is coaxial with the hollow shaft E, and standing in engagement with the cone wheel $e^2$, and a cone wheel $a^4$, which stands in engagement with the cone wheel $g^2$, is formed in one piece with the gear wheel $a^3$, and is mounted rotatably upon the shaft G.

The second drive is constructed similarly to the first drive and consists of a hand wheel $f^1$, a shaft F, a worm $f^2$ (shown in dotted lines Fig. 2), a worm wheel $g^1$, the shaft G coaxial with the hollow shaft E, a cone wheel $g^2$, a cone wheel $e^2$ and a cone wheel $a^4$. The worm wheel $g^1$ is rigidly connected with the shaft G.

The two shafts D and F, as well as the coaxial shafts E and G, are carried in the manner shown in Figs. 1 and 2 by two housings $c^1$ and $c^2$, which are rigidly connected with the mount.

The worm gears $d^2$, $e^1$ and $f^2$, $g^1$ are designed with equal ratios of transmission, so that the shafts E and G must rotate with equal speed when the hand wheels $d^1$ and $f^1$ are rotated with equal angular velocity. Both worm gears are self locking. In consequence, the shaft G will remain at rest so long as the hand wheel $d^1$ alone is rotated. The cone wheels $e^2$, $g^2$, $a^4$ act in this case like an ordinary bevel gear. Since this has a ratio of transmission equal to 1, the gear wheel $a^3$ engaging with the toothed arc $a^2$ must rotate at the same speed as the shaft E, when the hand wheel $d^1$ alone rotates. If on the other hand, only the hand wheel $f^1$ is rotated, the shaft E and the cone wheel $e^2$ remain at rest while the cone wheel $g^2$ revolves about the fixed cone wheel $e^2$. The cone wheels $e^2$, $g^2$, $a^4$ constitute in this case, parts of a planetary gear and according to known laws of planetary gears, with the present ratio of transmission of the wheels, they transmit the rotation of the hand wheel $f^1$ to the gear wheel $a^3$ in such a manner, that the latter rotates twice as fast as the shaft G. Under otherwise equal conditions, it is thus possible to move the gun barrel twice as rapidly through the medium of the hand wheel $f^1$ as through the medium of the hand wheel $d^1$.

Outside of the housing $c^2$, upon one end of the shaft G is secured a drum $g^4$, which is provided with a graduation $g^5$ for the adjustment of the gun barrel to the elevation corresponding to the distance of the target; the appropriate adjusting marker $c^3$ being arranged upon the housing $c^2$ (compare Fig. 2). On the other end of the shaft G is secured a cone wheel $g^6$ which serves for driving the sighting device.

The sighting arrangement, which is well known and need therefore only be briefly explained, consists essentially, of a telescope $h^1$, a curved attachment bar H and the attachment box $a^5$ (Fig. 1) secured to the slide-track carrier A. The rear side of the attachment bar H is provided with teeth $h^2$ in which engages a worm $h^4$ arranged upon a shaft $H^3$. The shaft $H^3$ is mounted in the manner shown in Fig. 1, upon the attachment box $a^5$. The drive of the worm $h^4$ is from the cone wheel $g^6$, which stands in engagement with the cone wheel $g^7$. This cone wheel $g^7$ is rigidly connected with the shaft $G^8$, which is mounted, in the manner shown in Fig. 1, upon the housing $c^1$. Since the shaft $H^3$ carrying the worm $h^4$ is mounted on the shiftable slide-track carrier A and the shaft $G^8$ is mounted upon the fixed mount C, a jointed and longitudinally movable coupling is introduced between the two shafts in a known manner, which coupling comprises two universal joints J, $J^1$ and two non-rotatable but longitudinally slidably connected shaft parts $J^2$, $J^3$.

The ratio of transmission of the drive of the sighting device is so determined that the angle through which the attachment bar H is adjusted relatively to the gun barrel by the turning of the hand wheel $f^1$, is equal to the angle through which the gun barrel will be rotated thereby when the hand wheel $d^1$ is at rest. Furthermore, the arrangement is so determined that the attachment bar and gun barrel rotate in opposite directions. In consequence of this, the sighting line maintains itself constantly parallel during the rotation of the hand wheel $f^1$.

In the use of the described arrangement, the hand wheel $d^1$ will be rotated by the layer and the hand wheel $f^1$, which imparts more rapid rotation to the gun barrel, will be served by the loader.

In order to direct the sighting line upon the target, the aimer rotates the hand wheel $d^1$. It is to be understood that at this time the hand wheel $f^1$ remains at rest. A rotation of the worm $h^4$ about its axis and therefore an adjustment of the attachment bar H relatively to the gun barrel cannot take place. The sighting line, therefore, partakes of the rotation which is imparted to the gun barrel through the hand wheel $d^1$, without changing the angle which it makes with the axis of the bore of the gun, and thus retains its direction at the target while the necessary lateral training is imparted to the gun barrel simultaneously, if necessary.

After the gun is charged, the loader, in order to bring the gun to an elevation corresponding to the distance of the target rotates the hand wheel $f^1$ until the marks $c^3$ points to the division of the scale $g^5$ on the drum $g^4$ which corresponds to the distance of the target.

The rotation of the hand wheel $f^1$ is transmitted through the shaft G through the medium of the cone wheels $g^6$, $g^7$, the shaft $G^8$, coupling J, $J^2$, $J^3$, $J^1$, the shaft $H^3$ and the worm gear $h^4$, $h^2$ to the attachment bar H and adjusts the latter in such a manner relatively to the gun barrel that the sighting line assumes the angular adjustment relatively to the bore of the gun, corresponding to the distance of the target. Since, if the hand wheel $d^1$ remains at rest during the described operation, the gun barrel will rotate in the opposite direction from and through an equal angle with the attachment bar, the sighting line remains parallel and retains its direction upon the target.

The transfer of the gun barrel from the loading to the firing position is accomplished as more fully explained above, with a comparatively greater speed.

Heretofore, for the sake of clearness, it has been pointed out that one of the hand wheels $d^1$ and $f^1$ is always at rest when the other is being rotated. It is, nevertheless, a fact that the aiming operation is in no manner disturbed if both hand wheels are served simultaneously.

After the gun is aimed and fired, the gun barrel is again brought to the loading position by rotation of the hand wheel $f^1$. This movement takes place with a comparatively greater speed. The direction of the sighting line relatively to the target remains at this time undisturbed.

The described embodiment of the elevating mechanism constituting the subject matter of the invention, possesses the superiority that it enables a rapid movement to be imparted to the gun barrel without the necessity of transforming it into a quick operating spur gear or the like which arrangement in many cases is impracticable owing to lack of room and in addition thereto would destroy the efficiency of the driving gear.

It should be further observed, that gun elevating mechanisms are known which have two independent driving means arranged upon parts of the mount which do not take part in the elevating movement of the gun barrel. Likewise in these known elevating mechanisms, the members which are positively connected, one with one of the driving members, another with another of the driving members and a third with the gun barrel, constitute a closed kinematic train in which, after fixing one of the two driving means, as well as the member of the train in connection therewith, a positive connection exists between the member connected with the other driving means, the member connected with the gun barrel, and a member connected immediately with the fixed member of the train. The known elevating mechanisms of this kind, are distinguished from that constituting the subject of the present invention in that the ratio of transmission of the positive connection which, by the fixing of one of the two driving means, is produced between the member connected with the gun barrel and that connected with the other driving means, regardless of whether one or the other of the driving means are fixed, is always the same value. In consequence of this, the known elevating mechanisms preclude, imparting to the gun barrel through the action of one of the driving means the more rapid movement than through the action of the other driving means, under otherwise equal circumstances, as may be done with the elevating mechanism constituting the subject matter of the present invention. This advantage can be realized with the known elevating mechanisms only under certain circumstances, for example by introducing between the driving means and a member of the kinematic train standing in communication therewith, a special part for transforming it into a quick driving spur gear or the like. In this case, it was necessary to take into consideration the above enumerated disadvantages, the overcoming of which constitutes an essential feature of the present invention.

Having thus described my invention, what I claim as new therein and desire to secure by Letters Patent is:—

1. In a gun elevating mechanism having two driving means independent of each other both arranged on a part of the mount which does not partake of the elevating movements of the gun barrel; means whereby one of said driving means, the conditions being otherwise equal, imparts a more rapid elevating movement to the gun barrel than the other driving means, constituting a closed kinematic train and comprising a part positively connected to one of the driving means, a part positively connected to the other driving means, and a part positively connected to the gun barrel; said kinematic train being adapted, when either of the driving means and the member of the train connected thereto is held stationary, to establish positive connection between the member connected to the other driving means, the member connected to the gun barrel, and the member connected to the stationary member of the train; and the ratio of transmission to the gun barrel produced by said connections when the one driving means is held stationary being of different value than when the other driving means is held stationary.

2. In a gun elevating mechanism having two driving means independent of each other, both arranged on a part of the mount which does not partake of the elevating movements of the gun barrel; means whereby one of said driving means, the conditions being otherwise equal, imparts a more rapid elevating movement to the gun barrel than the other driving means, constituting a closed kinematic train and comprising a gear rotated upon a fixed axis by one of the driving means, a revolving member meshing with said rotated gear, and rotatable upon an axis which is revolved by the other driving means about said fixed axis, and a gear driven by the revolving member having driving connection with the gun barrel; said kinematic train being thereby adapted, when either of the driving means and the member of the train connected thereto is held stationary, to establish positive connection between the member connected to the other driving means, the member connected to the gun barrel, and the member connected to the stationary member of the train, and with a ratio of transmission to the gun barrel of different value when the one driving means is held stationary than when the other driving means is held stationary.

3. In a gun elevating mechanism having two driving means independent of each other but both arranged on a part of the mount which does not partake of the elevating movements of the gun barrel; means whereby one of said driving means, the conditions being otherwise equal, imparts a more rapid elevating movement to the gun barrel than the other driving means, consisting of a curved rack and pinion elevating gear, and a planetary gear; said planetary gear comprising a driven gear-wheel rotating upon a fixed axis and rigidly connected with the pinion of the elevating gear, a driving gear-wheel rotating upon the same fixed axis, and positively connected to one of the driving means, and a bridging gear member positively connected to the other driving means, and meshing with the said driving and driven gear wheels, whereby a closed kinematic train is established, adapted, when either of the driving means and the member of the train connected thereto is held stationary, to establish positive connection between the member connected to the other driving means, the member connected to the elevating gear pinion, and the member connected to the stationary member of the train, and adapted to vary the ratio of transmission to the gun barrel, as one or the other of the driving means is held stationary.

4. In a gun elevating mechanism having an elevating gear and two driving means independent of each other, arranged on opposite sides of the mount and upon a part thereof which does not partake of the elevating movements of the gun barrel and provided with means for locking them against rotation; means whereby one of said driving means, the conditions being otherwise equal, imparts a more rapid elevating movement to the gun barrel than the other driving means, comprising a cross-shaft driven by the more rapid driving means, planetary gear members loosely mounted on said cross-shaft, connected respectively with the slower driving means and the elevating gear, and an arm rigidly carried by said cross-shaft, having journaled therein a bridging gear member meshing with both said loosely mounted gears.

5. In a gun elevating mechanism having an elevating gear, and two independent driving means arranged on either side of and upon a part of the mount which does not partake of the elevating movements of the gun barrel; means whereby one of said driving means, under otherwise equal conditions, imparts a more rapid elevating movement to the gun barrel than the other driving means, constituting a closed kinematic train having three members positively connected with the two driving means and the elevating gear, respectively and adapted, when either of the driving means and the member of the train connected thereto is held stationary, to establish positive connection between the member connected to the other driving means, the member connected with the elevating gear, and the member connected to the stationary member of the train; and the ratio of transmission to the gun barrel produced by said connections when the one driving means is held stationary being of different value than when the other driving means is held stationary; and a sighting device located on the side of the gun with the slower driving means.

6. In a gun elevating mechanism having an elevating gear, and two independent driving means arranged on either side of and upon a part of the mount which does not partake of the elevating movements of the gun barrel; means whereby one of said driving means, under otherwise equal conditions, imparts a more rapid elevating movement to the gun barrel than the other driving means, constituting a closed kinematic train having three members positively connected with the two driving means and the elevating gear, respectively and adapted, when either of the driving means and the member of the train connected thereto is held stationary, to establish positive connection between the member connected to the other driving means, the member connected with the elevating gear, and the member connected to the stationary member of the train; and the ratio of transmission to the gun barrel produced by said connections when the one driving means is held stationary being of different value than when the other driving means is held stationary; and a sighting device located on the side of the gun with the slower driving means, mounted upon an elevating part of the gun, and having means imparting elevation adjustment to the sighting device with positively driven connections with the faster driving means.

7. In a gun elevating mechanism having an elevating gear, and two independent driving means arranged on either side of and upon a part of the mount which does not partake of the elevating movements of the gun barrel; means whereby one of said driving means, under otherwise equal conditions, imparts a more rapid elevating movement to the gun barrel than the other driving means, constituting a closed kinematic train having three members positively connected with the two driving means and the elevating gear, respectively and adapted, when either of the driving means and the member of the train connected thereto is held stationary, to establish positive connection between the member connected to the other driving means, the member connected with the elevating gear, and the member connected to the stationary member of the train; and the ratio of transmission to the gun barrel produced by said connections when the one driving means is held stationary being of different value than when the other driving means is held stationary; and a sighting device located on the side of the gun with the slower driving means, mounted upon an elevating part of the gun, and having means imparting elevation adjustment to the sighting device with positively driven connections with the faster driving means, said driven connections being adapted when the faster driving means alone is actuated, to adjust the sighting line simultaneously with but in opposite directions to the gun barrel.

8. In a gun elevating mechanism having an elevating gear, and two independent driving means arranged on either side of and upon a part of the mount which does not partake of the elevating movements of the gun barrel; means whereby one of said driving means, under otherwise equal conditions, imparts a more rapid elevating movement to the gun barrel than the other driving means, constituting a closed kinematic train having three members positively connected with the two driving means and the elevating gear, respectively and adapted, when either of the driving means and the member of the train connected thereto is held stationary, to establish positive connection between the member connected to the other driving means, the member connected with the elevating gear, and the member connected to the stationary member of the train; and the ratio of transmission to the gun barrel produced by said connections when the one driving means is held stationary being of different value than when the other driving means is held stationary; and a sighting device located on the side of the gun with the slower driving means, mounted upon an elevating part of the gun, and having means imparting elevation adjustment to the sighting device with positively driven connections with the faster driving means, said kinematic train also embodying a through transverse shaft, and said sight adjusting connections embodying a bevel gear at the end of said shaft and a telescoping flexible shaft between said bevel gear and the sighting device.

The foregoing specification signed at Barmen, Germany, this 24th day of December, 1909.

FRANZ BÖMINGHAUS. [L. S.]

In presence of—
  OTTO KÖNIG,
  CHAS. J. WRIGHT.